June 25, 1963  F. G. CHESLEY  3,095,096
MANIPULATOR
Filed March 27, 1961  3 Sheets-Sheet 1

INVENTOR.
FRANK G. CHESLEY
BY
Moore, White & Burd
ATTORNEYS

June 25, 1963
F. G. CHESLEY
3,095,096
MANIPULATOR
Filed March 27, 1961
3 Sheets-Sheet 2
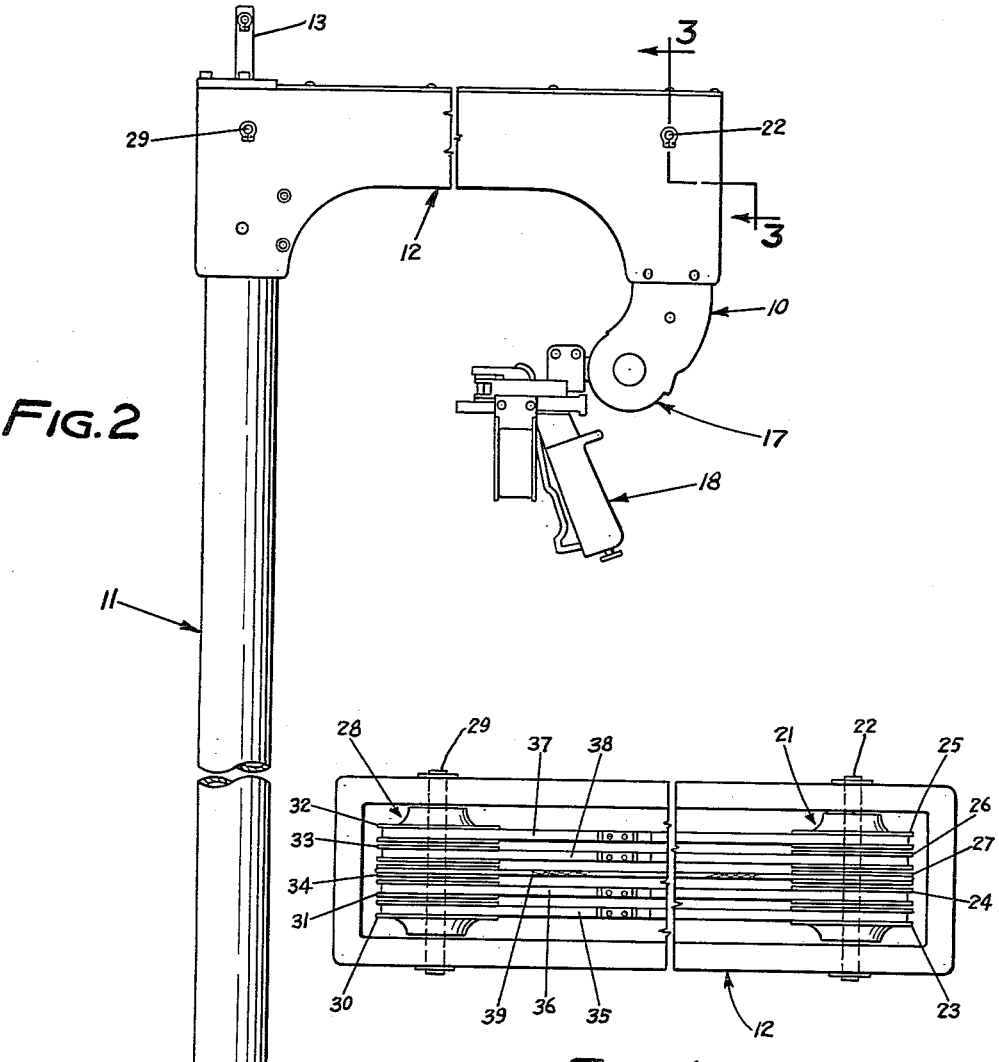
Fig. 2
Fig. 4
INVENTOR.
FRANK G. CHESLEY
BY 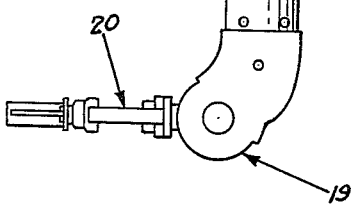
ATTORNEYS June 25, 1963  F. G. CHESLEY  3,095,096
MANIPULATOR
Filed March 27, 1961  3 Sheets-Sheet 3
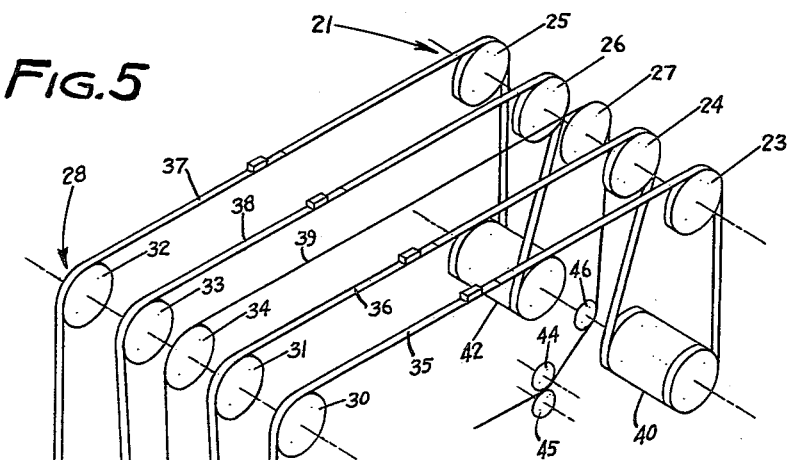
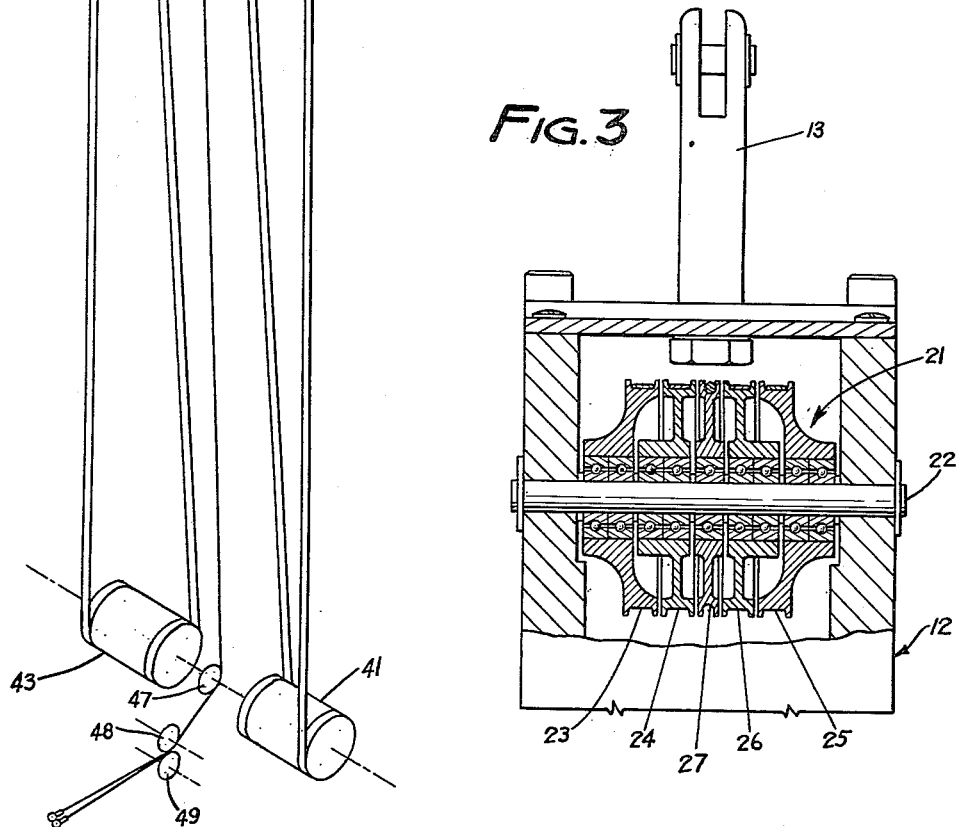
INVENTOR.
FRANK G. CHESLEY
BY
Moore, White & Burd
ATTORNEYS United States Patent Office 3,095,096
Patented June 25, 1963

3,095,096
MANIPULATOR
Frank G. Chesley, Red Wing, Minn., assignor to Central Research Laboratories, Inc., Red Wing, Minn., a corporation of Minnesota
Filed Mar. 27, 1961, Ser. No. 98,365
7 Claims. (Cl. 214—1)

This invention relates to a remote control master-slave manipulator of the type by which movements of a handle or gripper means engaged by an operator are reproduced in a claw or tong means in some remote location. More particularly, the manipulator of this invention is an extension manipulator adapted for grappling and fishing at the bottom of a canal or pool or the like. The handle or gripper means are connected to the lower end of a master arm and the claw or tong means are connected to the lower end of a slave arm. The master and slave arms are interconnected. They are of fixed length but may be of the same or of different lengths depending upon particular requirements. The slave arm is adapted to extend to an area which is inaccessible or dangerous to the operator.

The invention is illustrated in the accompanying drawing in which like numerals are used to designate like parts and in which:

FIGURE 2 is a side elevation of the extension manipulator;

FIGURE 3 is a fragmentary end elevation, partly broken away and partly in section, taken generally on the line 3—3 of FIGURE 2 and in the direction of the arrows;

Figure 1:
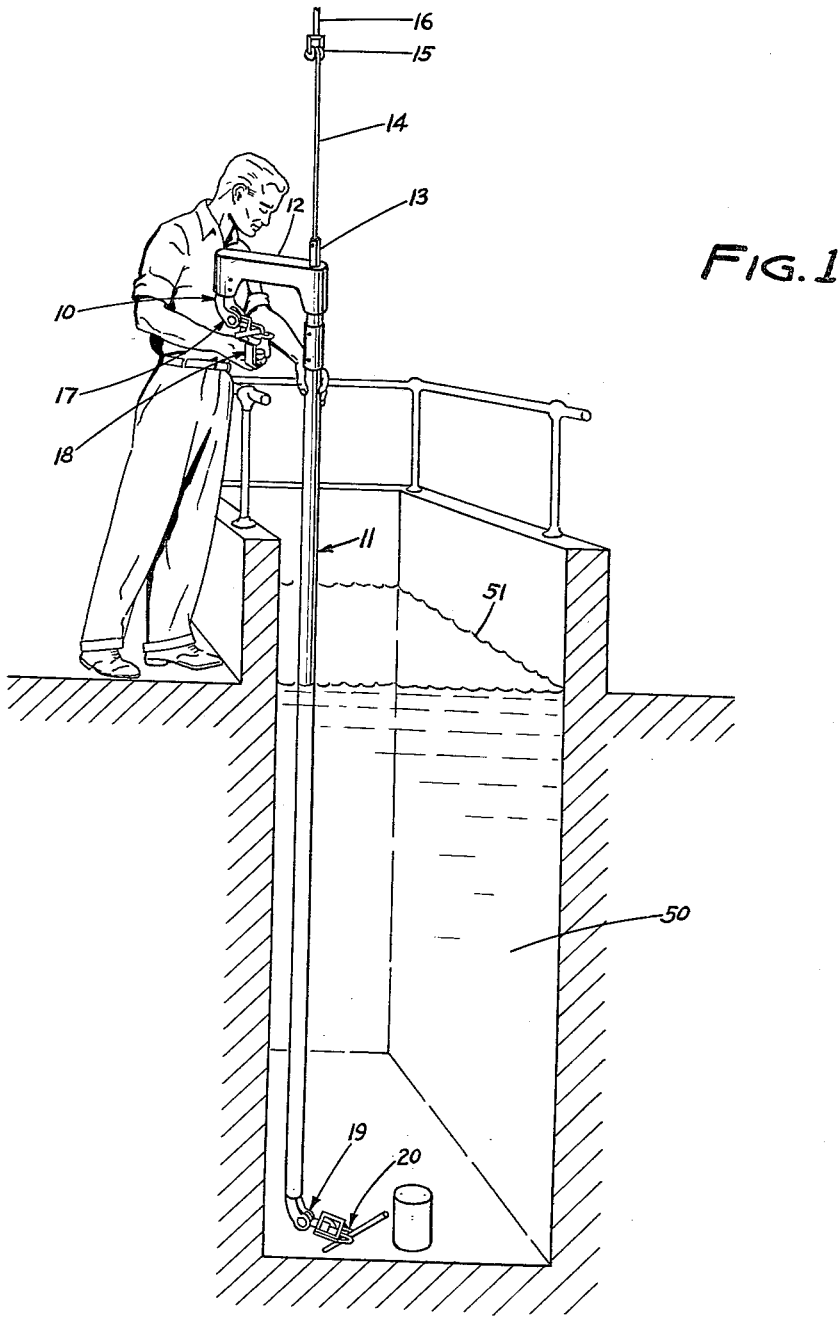
FIGURE 1 is a perspective view, partly in section, showing the extension manipulator according to the present invention in use in a deep pool.

FIGURE 4 is a top plan view of the connecting housing between the master and slave arms, with the top plate removed, and foreshortened; and FIGURE 5 is a perspective schematic representation showing how rotation of the handle or gripper means through the elevation and twist motions about two axes in the master arm wrist joint produces corresponding rotation in the claw or tong means of the slave arm, and how opening and closing of the handle or gripper on the master arm causes corresponding opening and closing of the claw or tong means on the slave arm.

Referring now to the drawings, the extension manipulator according to the present invention comprises generally a master arm 10, a slave arm 11, and an interconnecting housing or support 12. The entire manipulator is suspended from a bracket 13 mounted on top of the housing 12 and connected to a tape 14 or similar suspending means. Tape 14 is desirably connected to a constant force spring suspension device 15 which in turn is suspended at 16 from the ceiling or other suitable support.

The master arm portion of the manipulator is fitted with a wrist joint, indicated generally at 17, to which is attached handle or gripper means, indicated generally at 18. The end of slave arm 11 is also provided with a wrist joint, indicated generally at 19, to which is connected a claw or tong means, indicated generally at 20. Details of construction of wrist joints and handle or gripper and claw or tong means are described in detail in Goertz et al. Patent 2,695,715, issued November 30, 1954 and Patent 2,764,301, issued September 25, 1956. The latter patent shows preferred construction. Since these details of construction per se form no part of the present invention, they are not repeated here.

As is well understood in the art, the manipulator motions are converted into rotary motions and then transmitted from the master arm through the support housing to the slave arm by means of linear motion transmission means, such as tapes or cables, and then reconverted into rotary motions and into corresponding manipulator motions in the slave arm.

A bank of pulleys, indicated generally at 21, is located in the master arm end of the interconnecting support housing 12 mounted on shaft 22 which extends transversely through the support housing. The pulley bank 21 includes a plurality of pulleys 23–27 each journaled for independent rotation about shaft 22. A similar pulley bank, indicated generally at 28, is mounted on shaft 29 extending through the support housing at the slave arm end. Pulley bank 28 includes pulleys 30–34 each journaled for independent rotation about shaft 29. A plurality of tapes 35–38 and a cable 39 extend from the handle and wrist joint of the master arm over the pulley bank to the wrist joint and tong of the slave arm.

The system by which elevation and twist motions are transmitted from the wrist joint and handle mechanism of the master arm to the wrist joint and tong mechanism of the slave arm is illustrated schematically in FIGURE 5. One end of tape 35 is secured to a drum 40 associated with the wrist joint and handle mechanism which is rotated in response to manipulation of the handle by the operator through direct linkage, as described in the aforesaid Goertz Patent 2,764,301. Drum 40 is double grooved. As it is rotated in a clockwise direction as viewed in FIGURE 5, tape 35 is wound about the drum. This exerts tension upon the tape which is transmitted through the tape in its path up and over pulley 23 in the pulley bank 21 at the top of the master arm, around pulley 30 in pulley bank 28 at the top of the slave arm, and down to double grooved drum 41. Drum 41 is associated with the wrist joint and tong mechanism and causes manipulation of the tongs through direct linkage corresponding to the manipulation of the handle by the operator as described in the aforesaid Goertz et al. patent.

The opposite end of tape 35 is secured to drum 41 so that as the tape is wound onto drum 40 a corresponding length of tape is unwound from drum 41 to rotate that drum in the same clockwise direction. Tape 36 is attached at one end to drum 41 in the other groove and extending around the drum in the opposite direction from tape 35. Thus, as drum 41 is rotated in a clockwise direction due to the unwinding of tape 35 from the drum, tape 36 is wound onto the drum 41. This exerts a force on the tape 36 which is transmitted along the path of the tape upwardly and over pulley 31, around pulley 24, and downwardly to drum 40 to which the other end of the tape is attached. Tape 36 extends around drum 40 in the opposite direction from tape 35. The force exerted upon tape 36 causes that tape to unwind from drum 40 in extent equal to the winding of tape 35.

One end of tape 37 extends around the groove of a double grooved drum 42 and is secured to the drum. The other end of tape 37 extends around one groove of double grooved drum 43 and is attached to that drum. One end of tape 38 extends around drum 42 in the other groove and in the opposite direction and is secured to the drum. The other end of tape 38 extends around drum 43 in the other groove and in the opposite direction from tape 37 and is attached to the drum. Thus, when drum 42 is rotated in a clockwise direction due to manipulation of the handle by the operator, tape 37 is wound onto the drum exerting a force on the tape which is transmitted along the path of travel over pulley 25 and pulley 32 downwardly to drum 43 where it causes unwinding of tape 37 from that drum. The rotation of drum 43 in a clockwise direction due to the unwinding of tape 37 exerts a force on tape 38 which is transmitted along the path of that tape upwardly and over pulley 33, around pulley 26, and downwardly to drum 42 from which tape 38 is unwound in extent equal to the amount of tape 37 wound onto the drum. Thus, the motions of the operator in rotating the handle about its axes are transmitted to the slave arm to cause corresponding rotation of the tong means.

As also shown schematically in FIGURE 5, the squeezing motion of the operator on the handle means 18 of the master arm is transmitted to the tong means 20 of the slave arm. As fully described in the aforementioned Goertz et al. patent, squeezing of the handle 18 through direct linkage exerts tension on cable 39 which is transmitted through the cable. This force is transmitted along the path of cable 39 from the handle, between pulleys 44 and 45 in the wrist joint, around pulley 46, up and over pulley 27 in the bank at the top of the master arm, around pulley 34 in the bank at the top of the slave arm, down and around pulley 47 and between pulleys 48 and 49 in the slave arm wrist joint, to the tong means. By tightening his grip on the handle means the operator may cause the tongs to close on an object desired to be grasped and moved by the tongs. Tension on all of the tapes and cables is maintained substantially uniform.

The manipulator according to the present invention is shown in a typical installation in FIGURE 1 in which the operator is shown using the manipulator to handle objects at the bottom of a relatively deep canal or pool 50 filled with water 51. Manipulation of the tongs at the end of the slave arm through the elevation and twist motions and closing of the tongs is accomplished by the operator through manipulation of the handle means on the master arm as already described. Azimuth rotation and "X," "Y," "Z" translations are provided by gross movement of the vertical support tube suspended above the canal or pool.

Azimuth rotation, or rotation of the tongs about the longitudinal axis of the slave arm, is accomplished merely by rotating the entire manipulator about its axis of suspension which is aligned with the slave arm. "X" motion or movement of the master and slave arms together from side to side from the standpoint of the operator, pivoted on a common horizontal axis, is accomplished by the operator moving the suspended manipulator from side to side as required. "Y" motion, or movement of the arms in a direction back and forth toward and away from the operator, is accomplished simply by his pulling or pushing the suspended manipulator toward or away from him as required. "Z" motion, or vertical up and down movement of the arms, is accomplished by moving the suspended manipulator upwardly or downwardly on its constant force spring suspension means as required.

The relative lengths of the master arm and slave arm portions of the manipulator may be varied widely depending upon the particular operation in which the manipulator is to be used. For example, for performing operations in a glass walled tank or on the opposite side of a similar wall it may be desirable that the arms be of about equal length. For performing operations above the normal hand level of the operator it may be desirable that the master arm portion be longer than the slave arm portion of the manipulator. Similarly, the angles of the master and slave arm portions of the manipulator relative to the support housing may be varied according to requirements of use. For example, the slave arm may be canted forward to extend the "reach" of the manipulator.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A remote control master-slave manipulator comprising a master arm, a slave arm and an interconnecting housing between said master arm and slave arm, means for freely suspending said entire manipulator for rotational, side-to-side, forward-and-backward, and up-and-down movement above a work area, wrist joint and handle means at the end of said master arm, wrist joint and tong means at the end of said slave arm, and linear motion transmission means movable in response to manipulation of said handle means extending between the ends of said master and slave arms through said interconnecting housing to cause corresponding manipulation of said tong means.

2. A remote control manipulator according to claim 1 further characterized in that said master and slave arms are of fixed length and rigidly secured to said interconnecting housing.

3. A remote control manipulator according to claim 1 further characterized in that said wrist joint means are rigidly attached to said master and slave arms.

4. A remote control manipulator according to claim 1 further characterized in that said means for suspending said manipulator is aligned generally with the longitudinal axis of said slave arm.

5. A remote control manipulator according to claim 1 adapted for use in a deep pool or canal further characterized in that said master arm is relatively short and said slave arm is relatively longer.

6. A remote control manipulator according to claim 1 further characterized in that the longitudinal axes of said master and slave arms are generally parallel.

7. A remote control master-slave manipulator adapted for used in a deep pool or canal comprising a relatively short master arm, a relatively longer slave arm and an interconnecting housing between said master and slave arms, said master and slave arms being of fixed length and rigidly secured to said interconnecting housing, the longitudinal axes of said master and slave arms being generally parallel, means for freely suspending said manipulator for rotational, side-to-side, forward-and-backward, and up-and-down movement above a work area, said suspension means being aligned generally with the longitudinal axis of said slave arm, wrist joint means rigidly attached to the ends of said master and slave arms, handle means associated with the wrist joint of the master arm, tong means associated with the wrist joint of the slave arms, and linear motion transmission means movable in response to manipulation of said handle means extending between said wrist joint and handle and tong means through said interconnecting housing to cause corresponding manipulation of said tong means.

References Cited in the file of this patent

UNITED STATES PATENTS 2,632,574    Goertz _____ Mar. 24, 1953